(12) United States Patent
Hoffman et al.

(10) Patent No.: US 7,734,952 B1
(45) Date of Patent: Jun. 8, 2010

(54) SYSTEM AND METHOD FOR MAINTAINING A CONSTANT PROCESSOR SERVICE LEVEL IN A COMPUTER

(75) Inventors: Phillip M. Hoffman, Oreland, PA (US); Jessica A. Paragas, Springfield, PA (US); Anthony P. Matyok, Springfield, PA (US); Jeffery A. Stell, Exton, PA (US); Sharon M. Mauer, West Chester, PA (US); James W. Thompson, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 1470 days.

(21) Appl. No.: 10/974,194

(22) Filed: Oct. 27, 2004

(51) Int. Cl.
    *G06F 11/00* (2006.01)
(52) U.S. Cl. .......................... 714/10; 714/11
(58) Field of Classification Search .............. 714/10–13
    See application file for complete search history.

(56) References Cited

U.S. PATENT DOCUMENTS

| | | | | |
|---|---|---|---|---|
| 6,314,465 B1* | 11/2001 | Paul et al. | ................... | 709/226 |
| 6,865,591 B1* | 3/2005 | Garg et al. | ................... | 709/201 |
| 6,978,374 B1* | 12/2005 | Hansen et al. | .............. | 713/183 |
| 7,243,145 B1* | 7/2007 | Poortman | ................... | 709/223 |
| 2003/0120502 A1* | 6/2003 | Robb et al. | ................... | 705/1 |
| 2003/0191983 A1* | 10/2003 | Mann et al. | ................... | 714/11 |
| 2004/0153749 A1* | 8/2004 | Schwarm et al. | .............. | 714/11 |
| 2005/0138349 A1* | 6/2005 | Hoffman et al. | ............ | 713/150 |
| 2005/0138422 A1* | 6/2005 | Hancock et al. | ............ | 713/201 |
| 2005/0172164 A1* | 8/2005 | Fox et al. | ...................... | 714/13 |
| 2006/0107108 A1* | 5/2006 | Geng et al. | ................... | 714/11 |
| 2008/0163239 A1* | 7/2008 | Sugumar et al. | ............ | 718/105 |

* cited by examiner

*Primary Examiner*—Bryce P Bonzo
(74) *Attorney, Agent, or Firm*—Richard J. Gregson; Robert P. Marley

(57) ABSTRACT

A method and system for maintaining the execution speed of a multiprocessor computer system includes automatically detecting a change in instruction execution rate in a disabled processor by a threshold amount and determining an amount of change in instruction execution rate to adjust an actual system-level instruction execution rate to approximate a target system-level instruction execution rate. The target system-level execution rate being pre-determined. Thereafter, the method adjusts one or more instruction processor execution rates such that the actual system-level instruction execution rate approximates the target system-level instruction execution rate to overcome the loss of the disabled processor. One embodiment of the invention involves the use of a processor key for licensing of processor resources within the computer system and offers the option of enabling a dynamic processor recovery method as well as an automatic execution rate regulation method.

22 Claims, 3 Drawing Sheets

SYSTEM AND METHOD FOR MAINTAINING A CONSTANT PROCESSOR SERVICE LEVEL IN A COMPUTER

REFERENCE TO RELATED APPLICATIONS

The following U.S. patent applications have material relevant to the current invention and are incorporated herein by reference in their entirety.

U.S. application Ser. No. 09/676,162 filed Sep. 29, 2000, entitled "Authorization Key System for Selectively Controlling the Performance of a Data Processing System".

U.S. patent application Ser. No. 10/744,685 filed Dec. 23, 2003, entitled "System And Method For Metering The Performance Of A Data Processing System".

FIELD OF THE INVENTION

The current invention relates generally to data processing systems, and more particularly to methods for maintaining a constant instruction execution rate within a computer system.

BACKGROUND OF THE INVENTION

Many businesses are intolerant to the loss of service in computer equipment that provides services to their business or customers. One example is telephone switchboard service. Businesses may use telephony equipment to route calls for their employees as well as providing service for their clients. Loss of computerized telephony equipment can slow down or shut down business operations until a serviceman or other trained specialist can recover the computerized system to full operation. Service loss, even partial loss, could be the result of a hardware or software fault resulting in a disabled processor within the critical equipment. In systems with multiple processors, loss of a single processor can adversely affect the ability of the business to maintain service levels to their employees or customers. Often, manual equipment operator intervention is needed to recover those systems when a processor becomes disabled.

Prior art computer equipment can employ redundancy and have the capability to switch to a backup subsystem upon detection of an anomaly in equipment functions. But this redundancy switching can sometimes require manual intervention. Additionally, if redundancy is not available, then functionality may simply be lost or seriously degraded until the equipment is repaired or replaced.

Thus, there is a need for a mechanism in a multiprocessor computer systems to recover from a disabled processor without human intervention. The present invention addresses the aforementioned needs and solves them with additional advantages as expressed herein.

SUMMARY OF THE INVENTION

An embodiment of the invention includes a method of maintaining processor performance in a computer system having at least two processors. The multiprocessor environment allows recovery of a disabled processor by either or both of two techniques; a dynamic processor recovery and automatic execution rate regulation.

In one embodiment, the dynamic processor recovery includes detecting a disabled processor and find a replacement processor to accommodate the tasks of the disabled processor. First, a spare processor is sought in the same sub-POD as the disabled processor. If a substitution of processors can be made, the process stops, if not, a substitute processor is sought in another sub-POD. If successful, the process stops, if not, a recovery of the disabled processor is undertaken. Such a recovery is performed without a hardware or a software reboot.

In one embodiment, the automatic execution rate regulation includes detecting a disabled processor and determining the execution rate lost as a result of the disablement. The lost execution rate is then used as a measure to increase the rate of other processors in the system such that a total system-wide execution rate is maintained.

In one embodiment, dynamic recovery and automatic execution rate regulation may be used together to first seek out a substitute processor to replace a disabled processor. If no substitute is found, automatic execution rate regulation is provided to bring up the execution rate of the system to overcome the loss of the disabled processor as dynamic recovery continues and the disabled processor is brought back on-line. If the disabled processor is recovered, automatic execution rate regulation returns the system to a pre-established overall execution rate.

In one embodiment, a processor key may be used to enable one or both dynamic recovery or automatic execution rate regulation within a licensed system.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Partitioned Computer Environment

Figure 1:
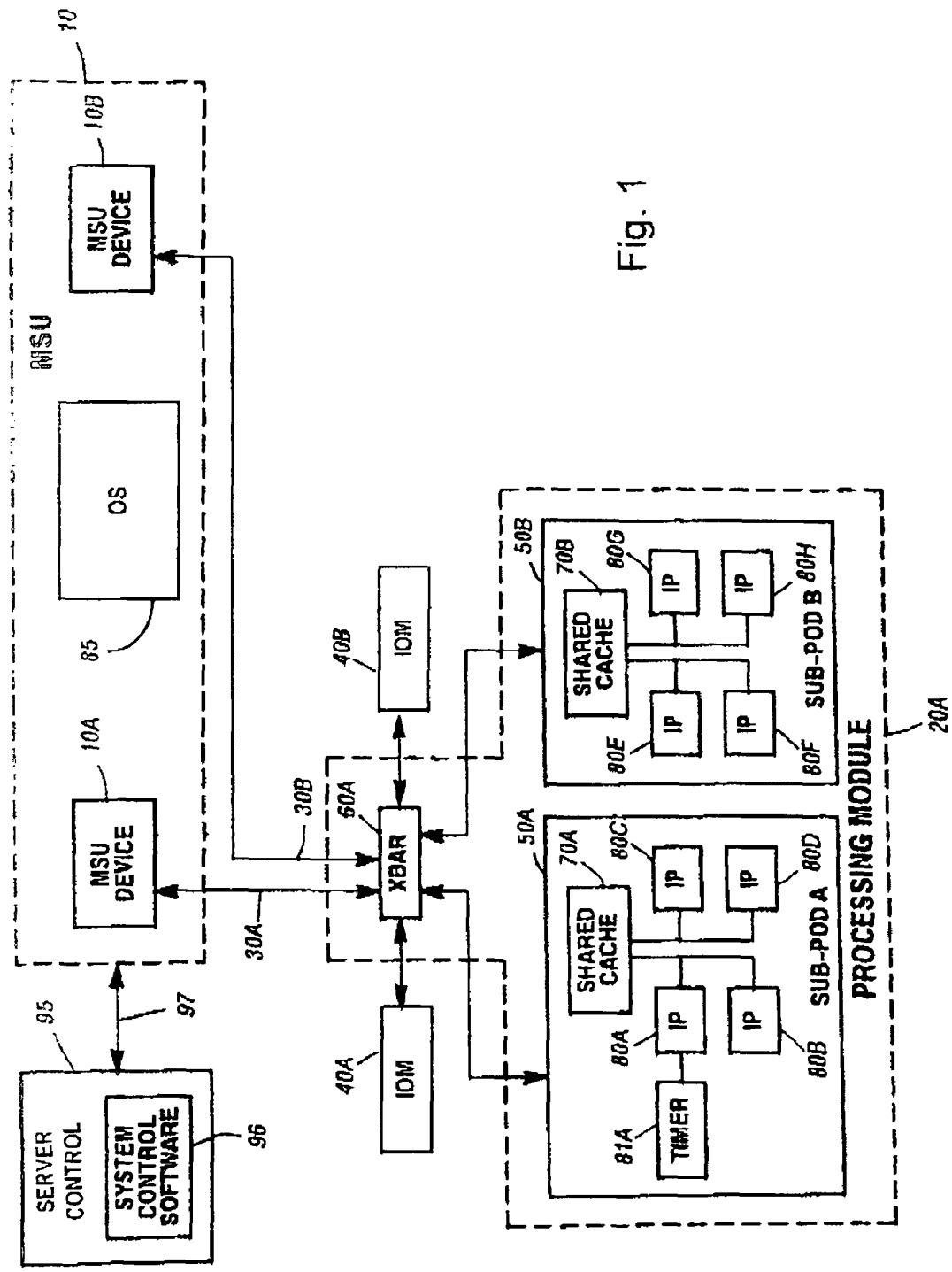
FIG. 1 is a block diagram of an exemplary system that may employ the current invention.

FIG. 1 is a block diagram of an exemplary computer system that may employ the current invention. This partitioned computer system includes a Memory Storage Unit (MSU) 10 which provides the main memory facility for the system The MSU includes one or more MSU devices individually shown as MSU 10A and MSU 10B, which each contains a predetermined portion of the memory space of the system There may be multiple MSU's in a partitioned computer system.

The system further includes a processing module (PODs) 20. A POD provides the processing capability for partitions within the computer system A greater number of PODs may be included in the system than are shown in FIG. 1. The POD is coupled to each of the MSU devices via a dedicated, point-to-point connection referred to as an MSU Interface (MI), individually shown as MIs 30A and 30B. For example, MI 30A interfaces POD 20 to MSU device 10A, and MI 30B interfaces POD 20 to MSU 10B device. The POD includes two sub-processing modules (Sub-PODs) and a crossbar module (XBAR). For example, POD 20A includes sub-PODs 50A and 50B and XBAR 60. Each sub-POD is interconnected to the crossbar module (XBAR) through a dedicated point-to-point interface.

The system of FIG. 1 may further include input/output resource modules (IOMs) individually shown as IOMs 40A and 40B. The input/output modules provide the interface between various communications links and the POD 20. Each IOM is coupled to the POD via the POD's XBAR. For example, IOM 40A is coupled to XBAR 60. XBAR 60 buffers data for the respective sub-PODs 50A and 50B and IOM 40A and 40B and functions as a switch to route data between any of these sub-PODs and IOMs to an addressed one of the MSU devices 10A and 10B.

In the exemplary system of FIG. 1, each sub-POD includes a shared cache and one or more Instruction Processors (IPs). For example, sub-POD 50A includes shared cache 70A and IPs 80A-80D. Other sub-PODs are similarly configured. In one embodiment, a sub-POD 50 may include between one and four IPs 80. Each IP may include one or more dedicated caches and interface logic for coupling to the interface with the shared cache. The shared cache stores data for each of the IPs within its sub-POD. Finally, each IP includes a quantum timer shown as timer 81A for IP 80A. This timer has many uses, including the facilitation of multi-tasking for the respective IP.

The system of FIG. 1 includes at least one instance of an Operating System (OS) that is loaded into MSU 10 to control the system. OS 85 is shown generally occupying memory included within MSU 10, and it will be understood the selected memory range in which OS 85 resides will actually be provided by one of MSU devices 10A or 10B.

Finally, the system of FIG. 1 includes a system server 95, which may be a workstation, personal computer, or some other processing system executing system control software 96. This system server 95 is coupled to the other units in the system via a scan interface 97. Although for simplicity, the scan interface is shown coupled solely to MSU 10, it will be understood it is coupled to the other units in the system as well. System server 95 provides all initialization, maintenance, and recovery operations for the system via the scan interface. In addition, the system server 95 may be employed by an operator to perform configuration activities.

The architecture of FIG. 1 may be utilized to construct a system of multiple partitions within a data processing system. It will be appreciated that the system of FIG. 1 is merely provided as an example computing environment in which the present invention may operate. Any other data processing system having any other type of configuration may usefully employ the inventive system and method to be discussed in the following paragraphs. With the foregoing available for discussion purposes, the current invention is described in regards to the remaining drawings.

Recovery of Processor Execution Power

In an aspect of the current invention, it is desirable to maintain a constant processing power service level in the event of either a total or partial loss of execution capability of one processor in a multiprocessing environment. For example, in the multiprocessor environment of FIG. 1, sub-POD A and sub-POD B (50A and 50B respectively) may be providing execution resources. Assume instruction processor (IP) 80A of sub-POD A and IP 80E of sub-POD B are the primary processors for a system providing instruction execution services. If one of these IP fails, either partially, or completely, the equivalent processing power may be recovered using one or more of the techniques described below as dynamic IP recovery and automatic instruction execution regulation.

Dynamic IP recovery is a technique to bring a replacement processor on-line to recover from the loss of execution if a processor fails. Initially, a processor performance monitor, such as software in the server control 95, can detect loss of execution capability. The performance monitoring software can notify the operating system (OS) 85 when a processor has been disabled. When the OS discovers a processor is losing execution speed or a processor has failed, the OS can enter a recovery routine in an attempt to bring additional processor resources online.

First, the OS attempts to enable a different processor in the same sub-POD where the disabled processor resides if one is available. For example, if IP 80A failed, the OS would try to bring IPs 80B, 80 C, or 80D on line to replace the failed IP 80A. Each processor would be tried in turn until a positive response from one of the redundant processors is received. If successful, the redundancy in available in sub-POD 50 A would be used advantageously to continue the processing goals of the sub-POD.

If finding a redundant processor in the same sub-POD fails, the OS attempts to enable a different processor in a different module if one is available. For example, if no redundant processors in sub-POD 50A respond to a request for replacement, then the available processors in sub-POD B 50B would be polled to determine if they are available. Since processor 80E is involved in the primary task of sub-POD B, a request for availability can be sent to processors 80F, 80G and 80H. Each processor can be polled in turn. If successful, the processing tasks assigned to disabled processor 80A may be transferred to the available processor in sub-POD B.

If finding an available processor in an another sub-POD fails, the OS can attempt to reinitialize and revive the previously disabled processor. For example, if no spare processors are available, then the more time consuming task of trying to recover the disabled processor 80A will occur. The recovery task may include such acts as providing hardware and software resets to the disabled processor 80A; the resets are performed so that a software reboot is not required.

Automatic instruction execution regulation is a technique to maintain a target instruction execution rate using the capability of other processors to recover from the loss if execution within a processor falters. Initially, a processor performance monitor, such as software in the server control 95, can detect loss of execution capability. The performance monitoring software can notify the operating system (OS) 85 when a processor has been disabled. When the OS discovers a processor is losing execution speed or a processor has failed, the OS can enter a recovery routine in an attempt to upwardly modulate the execution of other processors.

Initially, it is assumed that each active partition of the computer system is operating with a specific known processing power rating. This specific known processing power includes such information as the number of processors, the performance level (or speed) associated with each of these processors, and a specific type of processor configuration. The system server 95 software 96 uses the known and expected processing power as a target instruction execution level to match.

Next, the OS recovery software takes the actual processor count and processor expected performance as parameters and determines the associated performance level of the processors that would be required to maintain the target service level. The OS recovery software then sets the performance level of the processors automatically. All changes in processor performance level are accomplished immediately without interruption. As an additional aspect, the processing power recovery software is notified each time an automatic or manual processor configuration event occurs so that it can readjust, upward or downward, the performance level of the remaining processors to maintain a constant service level. This method is useful in system where the remaining or adjusted processors are executing the same tasks as the disabled processor. Therefore, the remaining instruction processors can assist in recovering from the loss of one or more disabled processors.

Automatic instruction execution regulation can be accomplished by implementation of a hardware only means, a software only means or a combination of hardware and software that effectively changes the clock rate which is driving the processors. Those of skill in the art can recognize that multiple implementations of this functionality are possible.

Figure 2:
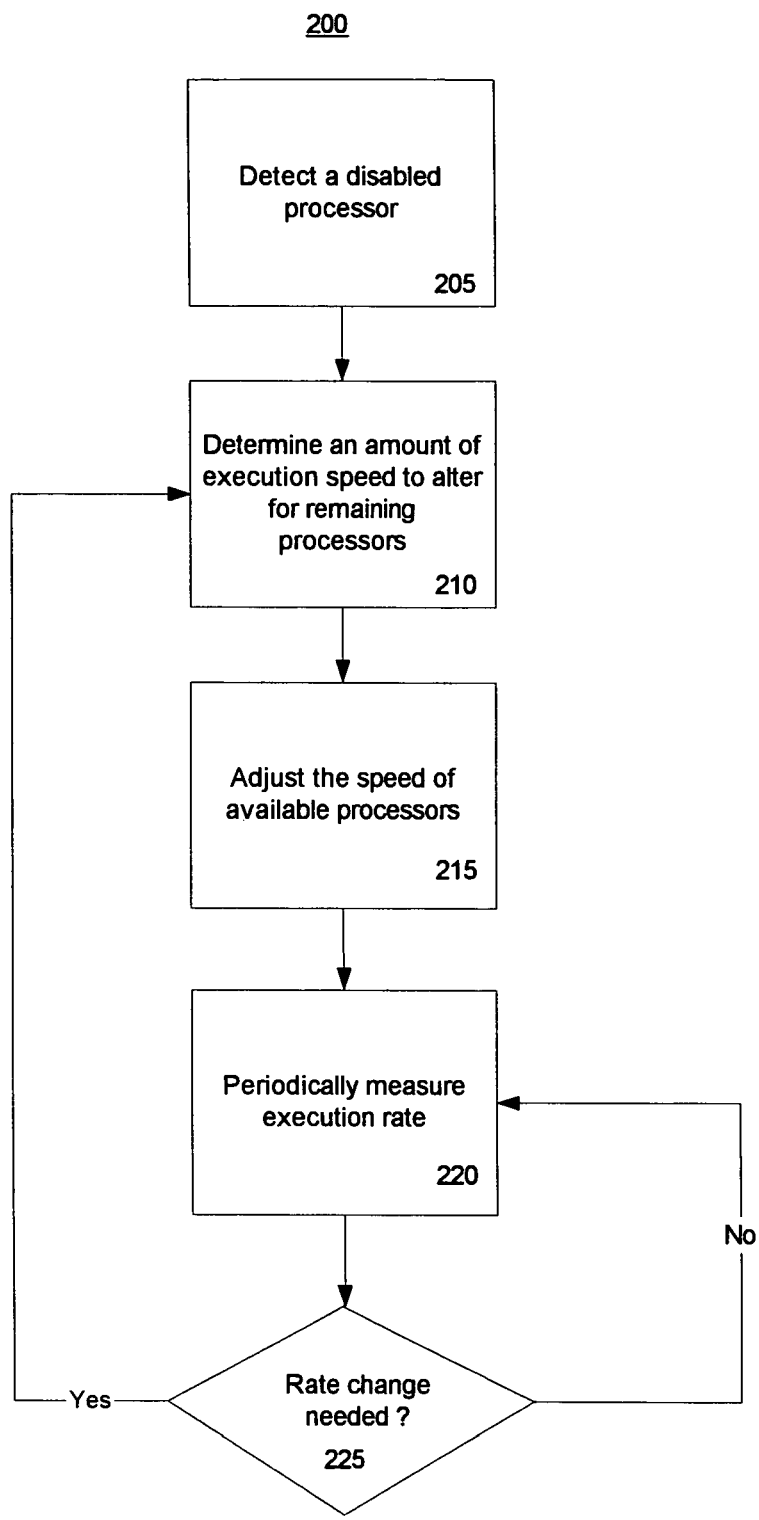
FIG. 2 is a flow diagram depicting a execution rate regulation scheme employed in an embodiment of the invention.

Automatic instruction execution regulation may be performed alone or in conjunction with dynamic IP recovery. FIG. 2 depicts a flow diagram of a method 200 to practice automatic instruction execution recovery. Initially, a processor performance monitor detects a processor that is behaving poorly or one that has failed in its instruction execution activity (step 205). This first sign indicates that a computer system may have a failing or failed processor and that total execution capability of the system may be compromised by the partial or total processor failure.

In one embodiment, a threshold variation in processor performance is used to detect whether a processor is failing its execution tasks. The threshold may be set to some reasonable level for a positive detection of either an over performance condition or an under-performance condition. This threshold may be a variable set by the system user or manufacturer. Examples of thresholds may be a change of execution rates of +/−10% through +/−50% before a positive indication is given that a threshold change has occurred.

Given that a threshold change has occurred (step 205), then a determination of the magnitude of an adjustment is made (step 210). This step may involve, according to computer configuration, an assessment of the number of available processors to take on the execution duties of the disabled processor as well as an assessment of the execution rate, in MIPS or RPMs. In the instance where a disabled processor results in execution rate loss, the algorithm to determine the speed change to recover the loss of execution is as follows:

$$\text{Increase} = \frac{\text{Total execution rate lose}}{\text{No. of available processors}}$$

In the instance where the execution rate increases because of a configuration change that brings on an additional processor, the algorithm to determine the speed change to reduce the execution rate is as follows:

$$\text{Decrease} = \frac{\text{Execution rate of new processor}}{\text{No. of available processors} - 1}$$

It is to be noted that these algorithms are general and that minor variations from these algorithms would still be within the scope of the invention.

After the amount of variation is determined (step 210), the adjustment of the speed of the available processors is performed (step 215). In a series of implementations, this step may be performed via a hardware only, a software only, and a combination of hardware and software implementation that effectively adjusts the throughput of the affected processors. For example, a hardware only mechanism may be a direct adjustment of the clock input to a processor. A software only implementation may be the introduction of wait states or an introduction of delay loops in the execution of a software program. An example of a combination of hardware and software would be the introduction of a programmable wait state generator or programmable clock speed generator controlled via data acquired in step 210. In any of the available implementations, an adjustment of the execution speed of one or more available processors, either an increase of a decrease, is achieved.

Once the speed of execution is adjusted, the computer system can stay at the prescribed execution rate until a rate change is needed. In order to determine if a rate change is needed, the system measures the execution rate of processors and makes the data available to the automatic execution rate adjustment software (step 220). The data is processed as part of the method 200 to determine if a rate change is needed (step 225). A rate change might be required if a processor becomes disabled, if a processor is recovered and is added to the system, or if there is a configuration change that alters the number of processors in the system Any of these events can trigger a need for a rate change. If a rate change is needed, the process 200 is returned to step 210 where the rate change calculations are performed. The calculated rate change is then made (step 215) and a periodic performance measurement is again taken. If a rate change is not needed as determined by step 225, then the process 200 returns to the periodic measurement of execution rates (step 220). In this way, the system is self regulating; operating at the performance rate pre-established for the system and its components.

Figure 3:
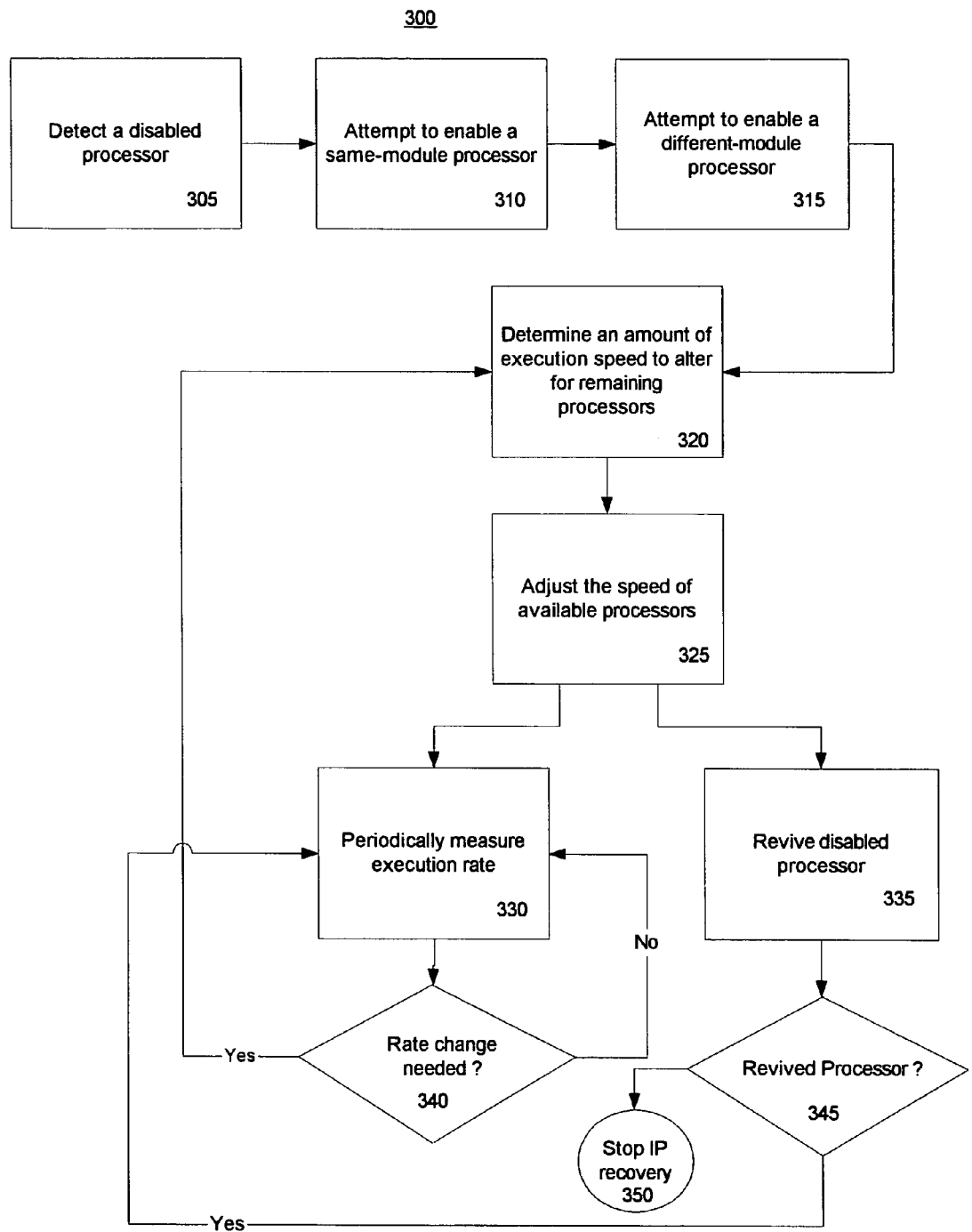
FIG. 3 is a flow diagram depicting a dynamic recovery scheme employed in an embodiment of the invention.

In another embodiment of the invention, a combination of dynamic IP recovery and automatic execution rate regulation occurs. FIG. 3 is flow diagram of a process 300 exemplary of such a combined procedure embodiment. Initially, a disabled processor is detected (step 305). Dynamic IP recovery may then be attempted as the process 300 attempts to enable a spare processor with the same module to replace the disabled processor (step 310). If this is successful, the process 300 will stop. However, if step 310 is not successful, dynamic IP recovery continues and an attempt is made to enable a spare processor in a different module (step 315). If this is successful, the process 300 will stop. However, if step 315 is not successful, then automatic execution rate regulation may begin. It may be advantageous to begin the automatic execution regulation at this point because it may take some additional time to fully recover a disabled processor whereas the automatic execution rate regulation can make up for the loss of a disabled processor in a short amount of time.

If a spare processor cannot be identified (via steps 310 and 315), then the amount of execution speed to recover is calculated (step 320). This calculation process is similar to that of step 210 of FIG. 2. Returning to FIG. 3, the processors to be adjusted are rate modulated (step 325) so as to make up the loss of the disabled processor. At this point, the system should be operating at a service level which is close to the service level of the system before the disable processor failed. Under these conditions, where the system is not operating below service requirements, a parallel course of activity may be taken. Here, the process may attempt to revive the disabled processor (step 335). As discussed above, this involves inducing a hardware, software, or combination of resets of the disabled processor without affecting system performance. This recovery technique is a last phase in the dynamic IP recovery scheme.

If the scheme is successful (step 345), the result is a new configuration with an additional processor and the automatic execution rate regulation process will adjust the execution speed down to the pre-established system levels by first measuring the new system execution rate (step 330), determining if a rate change is needed because of a configuration change (step 340), determining a new execution rate for the individual processors within the system (step 320) and correspondingly adjusting the speed of the available processors (step 325).

If the attempt to revive the disabled processor fails, the dynamic IP recovery portion of the process 300 halts (step 350). However, as mentioned earlier, after adjusting the effective combined processor execution speed of the system at step 325, the process continues to run in automatic execution rate regulation mode (steps 325 to 330) and regulates the execution rate of the system as described similarly in FIG. 2. Thus, if the dynamic IP recovery steps are successful, the disabled processor is recovered and the execution rate of the system is returned to its pre-failure rate. If the dynamic recovery steps fail, the system execution rate is still maintained at a rate that approximates the pre-failure execution rate. Either way, the system service level is maintained to accommodate the needs of the application.

In one embodiment of the invention, the invention is operated in conjunction with processor keys that enable the use of either a dynamic IP recovery, an automatic execution rate regulation, or both. In this environment, a partitioned computer system is defined which implements aspects of the invention. Also, this embodiment may include a method of measuring processor performance to determine if a processor execution rate has changed. U.S. application Ser. No. 10/744,685 filed Dec. 23, 2003, entitled "System And Method For Metering The Performance Of A Data Processing System", discloses a metering system and is incorporated herein by reference in its entirety.

Processor Key

A partition is a grouping of resources that are allocated to execute in a cooperative manner to perform one or more assigned tasks. A partitioned computer system provides that each partition has processor, memory and I/O resources. The system manufacturer provides a key to the system user so that specific partition resources are made available to the system user. Computing performance in partitioned computer systems may be determined by the use of a processor key. A processor key enables functionality within a partition and may establish processor performance limits within the partition Generally, there may be one processor key per established partition. The processor key for the partition defines baseline and ceiling processor performance parameters, expiration date and a maximum time of use for the identified partition. Patent application Ser. No. 09/676,162 entitled "Authorization Key System for Selectively Controlling the Performance of a Data Processing System" discloses the use of processor keys and is incorporated herein by reference.

A processor key may be modified to include field which enable the use of either dynamic IP recovery or automatic execution rate regulation. An internal format example embodiment of a processor key requiring the use of a processor key may encode the following data in 256 bits as shown in Table 1:

TABLE 1

Processor Key Format

| Data | Description | Bits |
| --- | --- | --- |
| Type | Type of Key<br>1 = permanent processor key<br>2 = temporary processor key | 4 |
| Version | Value = 5 | 4 |
| Images | Number of partition image licenses | 4 |
| MCN | Manufacturing Control Number (unique for each system) | 20 |
| Days | Number of days that a temporary key can be active | 10 |
| DR | Disaster Recovery = 1 | 1 |
| Reporting Day | Reporting day of month for metered utilization<br>0 = normal CoD<br>1-31 = metered utilization management | 5 |
| Record Interval | CoD special purpose<br>61 = Clear All key<br>62 = SAMM percentage test key<br>63 = SAMM performance level test key<br>Metering recording interval in minutes (value = 1 to 60) | 6 |
| Meter Mode | Mode of Metering Key<br>0 = Credit Mode<br>1 = Non-Credit Mode<br>2 = Profile Mode | 3 |
| Report Interval | Automatic sending of report interval<br>0 = monthly<br>1 = daily<br>2 = 8 hours<br>3 = 4 hours<br>4 = 2 hours<br>5 = hourly | 3 |
| Regulate RPM | Regulate RPM = 1 | 1 |
| Recover IPs | Recover IPs = 1 | 1 |
| Mem Licensing | Memory licensing required = 1 | 1 |
| IO Licensing | IO licensing required = 1 | 1 |

TABLE 1-continued

Processor Key Format

| Data | Description | Bits |
|---|---|---|
| IO Limiting | IO Limit of 30,000 IOs/Sec to be Enforced = 1 | 1 |
| Expiration | Key expiration (or 0) in Posix time DIV (24 * 60 * 60) format | 16 |
| Machine ID | 8 bit WATI machine type + 8 bit type modifier | 16 |
| Unique Key ID | Key creation Posix time (seconds since Midnight Jan. 1, 1970); Unique Key ID used to mark use and prevent reuse of temporary keys | 32 |
| Partition Image Descriptions | License image information for up to 4 partitions<br>Redundant          1 bit<br>Price Point        4 bits<br>IP Performance Level  6 bits<br>Number of IPs-1    5 bits | 4 * 16 |
| Partition Image Ceiling or Base | Ceiling RPM value (CoD) or base RPM value (metering) for up to 4 partitions. Each RPM value is associated with the corresponding partition image descriptor. | 4 * 16 |
| Totals | | 256 |

The processor key in Table 1 is compatible with an instruction processor (IP) licensing scheme as in reference patent application Ser. No. 09/676,162 filed Sep. 29, 2000 entitled "Authorization Key System for Selectively Controlling the Performance of a Data Processing System" incorporated herein by reference. Consequently, the functions of the Table 1 data fields such as type, version, images, reporting features, identifiers, and image descriptions may be specific to the licensing of IPs within a partitioned computer system In addition, the processor key of Table 1 supports the use of automatic execution rate regulation and dynamic IP recovery.

Notable fields placed in the processor key of Table 1 are the Regulate RPM field and the Recover IPs field. The Regulate RPM field is a one bit field that, when set, enables automatic execution rate regulation. When the Regulate RPM bit field is set, any processor disablement will engage the method of FIG. 2 to maintain the execution rate of the system to within a tolerance of the licensed execution rate. The Recover IPs field of the processor key of Table 1 is a one bit field that can enable a three step recovery of a disabled IP as described previously. Those steps include enabling a replacement processor in the same sub-POD, enabling a replacement processor in another sub-POD, or attempting to recover the disabled processor. It should be noted that the Regulate RPM action and the recover IP action can be separate and act independently from one another. It is possible to have a computer system, having a processor key that enables one, both, or neither action. Also, the two action may work in conjunction with one another as described with respect to FIG. 3.

As mentioned above, while exemplary embodiments of the invention have been described in connection with various computing devices, the underlying concepts may be applied to any computing device or system in which it is desirable to implement a processor execution rate regulation and recovery method. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

As is apparent from the above, all or portions of the various systems, methods, and aspects of the present invention may be embodied in hardware, software, or a combination of both. When embodied in software, the methods and apparatus of the present invention, or certain aspects or portions thereof may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

While the present invention has been described in connection with the preferred embodiments of the various figures, it is to be understood that other similar embodiments may be used or modifications and additions may be made to the described embodiment for performing the same function of the present invention without deviating therefrom Therefore, the invention should not be limited to any single embodiment, but rather should be construed in breadth and scope in accordance with the appended claims.

What is claimed:

1. A method of maintaining processor performance in a computer system having at least two processors, the method comprising:

automatically detecting a change in instruction execution rate in a first processor, wherein the change varies more than a threshold amount;

determining an amount of change in instruction execution rate needed by one or more processors to adjust an actual system-level instruction execution rate to approximate a target system-level instruction execution rate; and automatically adjusting one or more instruction execution rates of the one or more processors such that the actual system-level instruction execution rate approximates the target system-level instruction execution rate.

2. The method of claim 1, wherein automatically detecting a change in instruction execution rate in a first processor comprises metering the instruction execution rate in the first processor and comparing the instruction execution rate in the first processor against an expected rate.

3. The method of claim 2, wherein the expected rate is a rate determined via a processor licensing key.

4. The method of claim 2, wherein the change represents a failure of the first processor and the threshold is a reduction from an expected execution rate of the first processor of between 10 to 50 percent.

5. The method of claim 1, wherein determining an amount of change in instruction execution rate needed by one or more processors comprises dividing the change in instruction execution rate in a first processor by a total number of processors in an active portion of the computer system.

6. The method of claim 1, wherein automatically adjusting one or more instruction execution rates of the one or more processors comprises modifying the clock speed of the one or more processors.

7. A method of recovering from a disabled processor event in a multiple processor computer system, the method comprising:
   detecting a disabled processor in a first module in a computer system comprising at least two modules;
   automatically attempting to enable a second processor in the first module to replace the disabled processor;
   attempting to enable a third processor in a second module to replace the disabled processor if the second processor does not respond; and
   increasing execution speed of processors other than the disabled processor to offset the loss of instruction execution from the disabled processor if the third processor does not respond.

8. The method of claim 7, further comprising attempting to revive the disabled processor if the third processor does not respond.

9. The method of claim 8, wherein attempting to revive the disabled processor comprises performing at least one of a hardware reset, a software reset and a diagnostic query on the disabled processor.

10. The method of claim 7, wherein detecting a disabled processor in a first module in a computer system comprises metering processor execution rate.

11. The method of claim 7, wherein automatically attempting to enable a second processor comprises attempting to enable a redundant processor in the first module and transferring execution tasks from the disabled processor to the second processor if the attempt to enable the redundant processor in the first module is successful.

12. The method of claim 7, wherein attempting to enable a third processor in a second module comprises attempting to enable a processor in a redundant module and transferring execution tasks from the disabled processor to the third processor if the attempt to enable the processor in the redundant module is successful.

13. The method of claim 7, wherein increasing execution speed of processors other than the disabled processor comprises:
   determining an amount of change in instruction execution rate needed by one or more processors to adjust a actual system-level instruction execution rate to approximate a target system-level instruction execution rate; and
   automatically adjusting one or more instruction execution rates of the one or more processors such that the actual system-level instruction execution rate approximates the target system-level instruction execution rate.

14. The method of claim 13, wherein the target system-level instruction rate is available via a processor licensing key.

15. The method of claim 13, wherein determining an amount of change in instruction execution rate needed by one or more processors comprises dividing the change in instruction execution rate in a first processor by a total number of processors in an active portion of the computer system.

16. The method of claim 13, wherein adjusting one or more instruction execution rates of the one or more processors comprises modifying the clock speed of the one or more processors to approximate the target system-level instruction execution rate.

17. A method of maintaining processor performance and recovering from a disabled processor in a computer system having at least two modules, each module containing at least two processors, the method comprising:
   (a) automatically detecting a change in instruction execution rate in a first processor, wherein the change varies more than a threshold amount;
   (b) determining an amount of change in instruction execution rate needed by one or more processors to adjust an actual system-level instruction execution rate to approximate a target system-level instruction execution rate;
   (c) automatically adjusting one or more instruction execution rates of the one or more processors such that the actual system-level instruction execution rate approximates the target system-level instruction execution rate;
   (d) automatically attempting to enable a second processor in a first module to replace the disabled processor;
   (e) attempting to enable a third processor in a second module to replace the disabled processor if the second processor does not respond; and
   (f) attempting to revive the disabled processor if the third processor does not respond;
   wherein steps (a), (b) and (c) are performed concurrently with steps (d), (e) and (f).

18. A system for maintaining execution rate in a computer system, the system comprising:
   at least two modules, each module having at least one processor;
   at least two processors, each processor having access to memory, the memory having commands which, when executed, perform the method comprising:
      automatically detecting a change in instruction execution rate in a first processor;
      determining an amount of change in instruction execution rate needed by one or more processors to adjust an actual system-level instruction execution rate to approximate a target system-level instruction execution rate; and
      automatically adjusting one or more instruction execution rates of the one or more processors such that the actual system-level instruction execution rate approximates the target system-level instruction execution rate;
   wherein the target system-level instruction execution rate comprises information found in a processor key.

19. A system for maintaining processor performance and recovering from a disabled processor in a computer system, the system comprising:
   at least two modules, each module having at least one processor;

multiple processors, each processor having access to memory, the memory having commands which, when executed, perform the method comprising:
- (a) automatically detecting a change in instruction execution rate in a first processor, wherein the change varies more than a threshold amount;
- (b) determining an amount of change in instruction execution rate needed by the multiple processors to adjust a actual system-level instruction execution rate to approximate a target system-level instruction execution rate;
- (c) automatically adjusting one or more instruction execution rates of the multiple processors such that the actual system-level instruction execution rate approximates the target system-level instruction execution rate;
- (d) automatically attempting to enable a second processor in a first module to replace the disabled processor;
- (e) attempting to enable a third processor in a second module to replace the disabled processor if the second processor does not respond; and
- (f) attempting to revive the disabled processor if the third processor does not respond;

wherein steps (a), (b) and (c) are performed concurrently with steps (d), (e) and (f).

20. A computer-readable medium having instructions therein, executable by a computer to perform a method of maintaining processor performance in a computer system having at least two processors, the method comprising:

automatically detecting a change in instruction execution rate in a first processor, wherein the change varies more than a threshold amount;

determining an amount of change in instruction execution rate needed by one or more processors to adjust an actual system-level instruction execution rate to approximate a target system-level instruction execution rate; and automatically adjusting one or more instruction execution rates of the one or more processors such that the actual system-level instruction execution rate approximates the target system-level instruction execution rate.

21. The computer-readable medium of claim 20, wherein the target system-level instruction rate is established by at least one data field in a processor key.

22. A computer-readable medium having instructions therein, executable by a computer to perform a method of recovering from a disabled processor in a computer system having at least two modules, each module containing at least two processors, the method comprising:
- (a) automatically detecting a change in instruction execution rate in a first processor, wherein the change varies more than a threshold amount;
- (b) determining an amount of change in instruction execution rate needed by one or more processors to adjust a actual system-level instruction execution rate to approximate a target system-level instruction execution rate;
- (c) automatically adjusting one or more instruction execution rates of the one or more processors such that the actual system-level instruction execution rate approximates the target system-level instruction execution rate;
- (d) automatically attempting to enable a second processor in the first module to replace the disabled processor;
- (e) attempting to enable a third processor in a second module to replace the disabled processor if the second processor does not respond; and
- (f) attempting to revive the disabled processor if the third processor does not respond;

wherein steps (a), (b) and (c) are performed concurrently with steps (d), (e) and (f).

* * * * *